(12) United States Patent
Crear et al.

(10) Patent No.: US 9,821,543 B1
(45) Date of Patent: Nov. 21, 2017

(54) ADDITIVE MANUFACTURING POWDER HANDLING SYSTEM

(71) Applicant: General Electric Company, Schenectady, NY (US)

(72) Inventors: Donnell Eugene Crear, Simpsonville, SC (US); Archie Lee Swanner, Jr., Easley, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/287,981

(22) Filed: Oct. 7, 2016

(51) Int. Cl.
| | | |
|---|---|---|
| *B29C 31/00* | (2006.01) | |
| *B29C 35/02* | (2006.01) | |
| *B33Y 40/00* | (2015.01) | |
| *B65G 53/26* | (2006.01) | |
| *B65G 53/60* | (2006.01) | |
| *B07B 1/00* | (2006.01) | |

(52) U.S. Cl.
CPC .............. *B33Y 40/00* (2014.12); *B65G 53/26* (2013.01); *B65G 53/60* (2013.01); *B07B 1/00* (2013.01)

(58) Field of Classification Search
CPC ......... B33Y 40/00; B65G 53/60; B65G 53/26
USPC ...... 264/113, 308, 401; 425/375, 174.4, 193
See application file for complete search history.

(56) References Cited

U.S. PATENT DOCUMENTS

| | | | |
|---|---|---|---|
| 7,073,382 B2 | 7/2006 | Tsihlas et al. | |
| 7,686,995 B2 * | 3/2010 | Davidson | B29C 41/12 264/113 |
| 7,828,022 B2 | 11/2010 | Davididson et al. | |
| 7,887,316 B2 | 2/2011 | Cox | |
| 8,523,554 B2 * | 9/2013 | Tung | B29C 67/0081 222/233 |
| 8,888,480 B2 * | 11/2014 | Yoo | B29C 67/0081 264/113 |
| 2004/0084814 A1 * | 5/2004 | Boyd | B29C 64/153 264/497 |
| 2005/0208168 A1 * | 9/2005 | Hickerson | B29C 67/0077 425/174.4 |

(Continued)

FOREIGN PATENT DOCUMENTS

| | | | |
|---|---|---|---|
| WO | 9534468 | 12/1995 | |
| WO | WO 2013/039378 A1 * | 3/2014 | ......... B29C 67/0081 |

*Primary Examiner* — Nahida Sultana
(74) *Attorney, Agent, or Firm* — Ernest G. Cusick; Hoffman Warnick LLC

(57) ABSTRACT

An additive manufacturing powder handling system includes a powder container and at least two of: an overflow powder collector system configured to collect overflow additive manufacturing powder from the additive manufacturing printer and pass the overflow additive manufacturing powder into the powder container; a vacuum system configured to receive by vacuum force additive manufacturing powder from an additive manufacturing printer and pass the additive manufacturing powder into the powder container; a sieve system configured to filter the additive manufacturing powder; and a powder container moving apparatus configured to move the powder container between any two of the additive manufacturing printer, the overflow powder collector system, the vacuum system, and the sieve system. The powder container includes a powder container coupling. Each of the overflow powder collector system, the vacuum system, and the sieve system includes at least one coupling element configured to receive the powder container coupling.

19 Claims, 8 Drawing Sheets

(56) References Cited

U.S. PATENT DOCUMENTS

| | | | |
|---|---|---|---|
| 2006/0236855 A1* | 10/2006 | Handte | B01D 46/0093 95/1 |
| 2013/0108726 A1* | 5/2013 | Uckelmann | B29C 67/0007 425/174.4 |
| 2014/0238438 A1* | 8/2014 | Segev | H01J 37/02 134/1.1 |
| 2016/0052165 A1 | 2/2016 | Hartmann | |
| 2016/0229100 A1* | 8/2016 | O'Brien | B29C 45/42 |
| 2017/0014905 A1* | 1/2017 | Kawada | B29C 64/20 |

* cited by examiner

ADDITIVE MANUFACTURING POWDER HANDLING SYSTEM

BACKGROUND OF THE INVENTION

The subject matter disclosed herein relates to additive manufacturing. More particularly, the subject matter disclosed herein relates to systems for handling additive manufacturing powder.

Additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic, much of which is cut away and discarded, the only material used in additive manufacturing is what is required to shape the part. Additive manufacturing processes may include but are not limited to 3D printing, rapid prototyping (RP), direct digital manufacturing (DDM), selective laser melting (SLM), and direct metal laser melting (DMLM).

With AM printers that use an AM powder, there is a significant amount of handling and processing of AM powder. The AM powder is loaded into an AM printer from a powder container, often gravity-fed or gravity-assisted. After printing objects in the AM printer, overflow powder can be removed or processed for reuse. Processing overflow powder for reuse typically entails moving the overflow powder, passing the overflow powder through a sieve or other filter to remove any foreign debris and facilitate uniformity of the powder particles, and returning the overflow powder to be reloaded in the AM printer. Typically, these steps are performed, often with aid of an operator, by equipment integrated with the AM printer. This equipment varies for each step, and is not configured to handle a uniform amount of AM powder at each step, or to consistently handle large quantities of AM powder. For example, a feed hopper to feed AM powder into the AM printer might hold a relatively large 18.93 liters (approximately five gallons) of AM powder, while an overflow canister that collects overflow AM powder after printing might hold only a relatively small 0.95 liters (approximately one quart) of overflow AM powder. The overflow canister can require frequent attention by an operator to move the overflow AM powder to processing areas of the AM printer for reuse. Each time an operator must tend to the overflow canister and the further processing steps, the operator is drawn away from other productive activities. Further, powder handling equipment, such as feed hoppers and overflow canisters, are not uniform between many different AM printers that might each be using the same type of AM powder, which requires more expense in equipment and organization of the different types of equipment.

BRIEF DESCRIPTION OF THE INVENTION

According to various embodiments, an additive manufacturing powder handling system includes a powder container and at least two of: an overflow powder collector system, a vacuum system, a sieve system, or a powder container moving apparatus. The powder container includes a powder container outlet and a powder container coupling having a predefined dimension. Each of the overflow powder collector system, the vacuum system, and the sieve system including at least one coupling element configured to receive the powder container coupling. The overflow powder collector system is configured to collect overflow additive manufacturing powder from the additive manufacturing printer and pass the overflow additive manufacturing powder into the powder container. The vacuum system is configured to receive by vacuum force additive manufacturing powder from an additive manufacturing printer and pass the additive manufacturing powder into the powder container. The sieve system is configured to filter the additive manufacturing powder. The powder container moving apparatus is configured to move the powder container between any two of the additive manufacturing printer, the overflow powder collector system, the vacuum system, and the sieve system. The powder container moving apparatus has a lift, a gripper on the lift, and a rotator on the lift, the gripper configured to hold the powder container, the rotator configured to rotate the gripper and any powder container held by the gripper.

According to some embodiments, an additive manufacturing powder handling system includes at least one powder container, at least one powder container connector, at least two of: an overflow powder collector system, a vacuum system, a sieve system, or a powder container moving apparatus. Each powder container includes a powder container outlet. The vacuum system includes a vacuum system inlet configured to receive by vacuum force additive manufacturing powder from an additive manufacturing printer, a vacuum system outlet coupled with the vacuum system inlet, and a vacuum generator coupled with the vacuum system inlet to create a vacuum force directed into the vacuum system through the vacuum system inlet. The sieve system includes a powder sieve to filter the additive manufacturing powder, a sieve system inlet coupled to the powder sieve and configured to receive the additive manufacturing powder from the powder container, and a sieve system outlet coupled with the powder sieve. The powder container moving apparatus moves the powder container between the additive manufacturing printer, the vacuum system, or the sieve system, the powder container moving apparatus having a lift, a powder container gripper on the lift, and a rotator on the lift, the gripper configured to hold the powder container, the rotator configured to rotate the powder container gripper. The at least one powder container connector is configured to detachably connect the at least one powder container with the vacuum system outlet, the sieve system inlet, and the sieve system outlet.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

Figure 1:
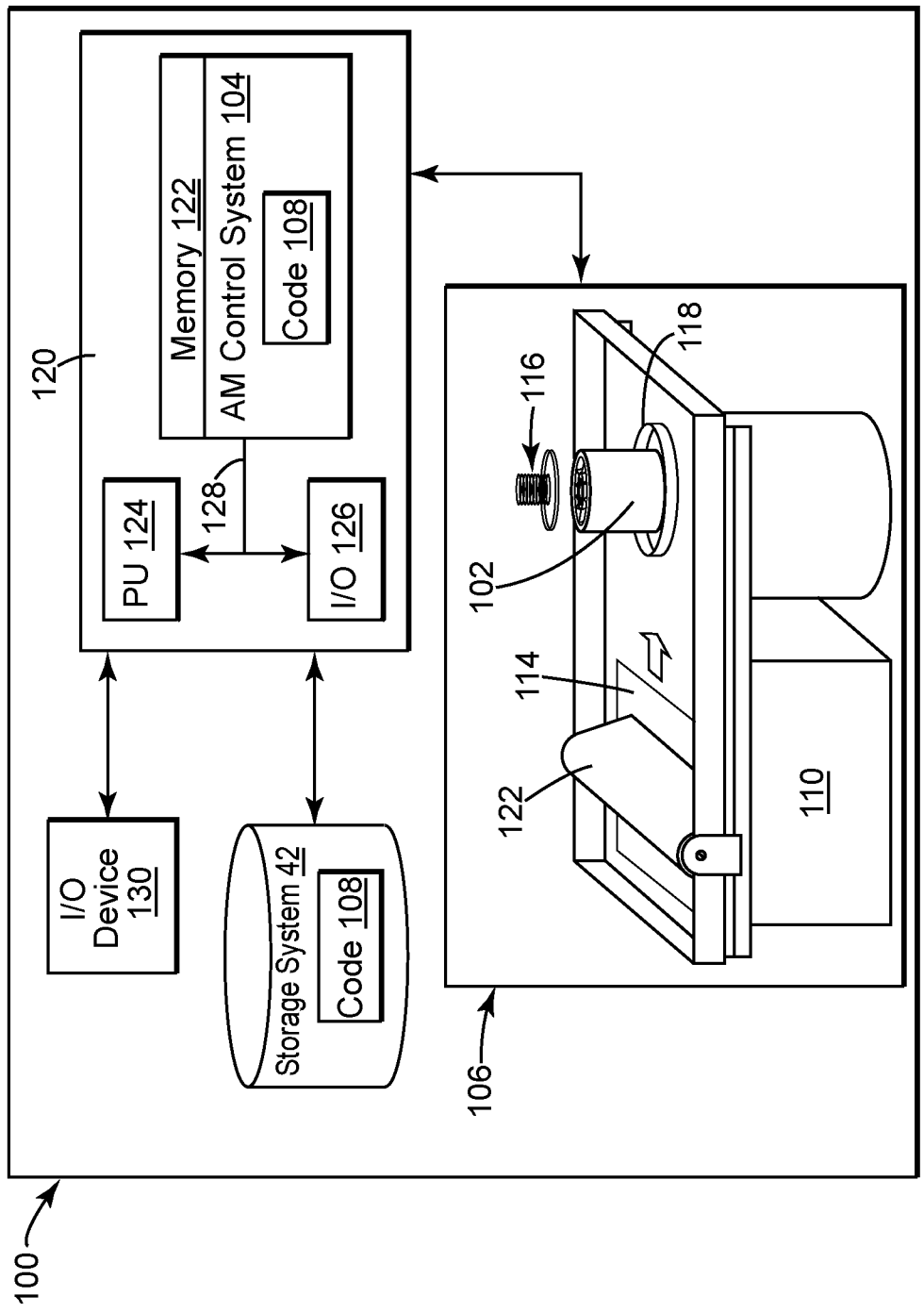
FIG. 1 shows a schematic/block view of an illustrative computerized additive manufacturing system for generating an object.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant components of an additive manufacturing printer. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. It is often required to describe parts that are at differing radial positions with regard to a center axis. It will be appreciated that such terms may be applied in relation to the center axis of the turbine. In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

As indicated above, the subject matter disclosed herein relates to AM printers, and more particularly to systems for handling AM powder. Systems disclosed herein facilitate uniformity of powder processing equipment and decrease the frequency an operator must reprocess overflow AM powder.

To illustrate an example of an additive manufacturing process, FIG. 1 shows a schematic/block view of an illustrative computerized additive manufacturing system 100 for generating an object 102. In this example, system 100 is arranged for DMLM. It is understood that the general teachings of the disclosure are equally applicable to other forms of additive manufacturing. Object 102 is illustrated as a double walled turbine element; however, it is understood that the additive manufacturing process can be readily adapted to manufacture other parts as desired. AM system 100 generally includes a computerized additive manufacturing (AM) control system 104 and an AM printer 106. AM system 100, as will be described, executes code 108 that includes a set of computer-executable instructions defining object 102 to physically generate object 102 using AM printer 106. Each AM process may use different raw materials in the form of, for example, fine-grain powder, liquid (e.g., polymers), sheet, etc., a stock of which may be held in a chamber 110 of AM printer 106. As illustrated, an applicator 112 may create a thin layer of raw material 114 spread out as the blank canvas from which each successive slice of the final object will be created. In the example shown, a laser or electron beam 116 fuses particles for each slice, as defined by code 108. Various parts of AM printer 106 may move to accommodate the addition of each new layer, e.g., a build platform 118 may lower and/or chamber 110 and/or applicator 112 may rise after each layer.

AM control system 104 is shown implemented on computer 120 as computer program code. To this extent, computer 120 is shown including a memory 122, a processor 124, an input/output (I/O) interface 126, and a bus 128. Further, computer 120 is shown in communication with an external I/O device/resource 130 and a storage system 132. In general, processor 124 executes computer program code, such as AM control system 104, that is stored in memory 122 and/or storage system 132 under instructions from code 108 representative of object 102. While executing computer program code, processor 124 can read and/or write data to/from memory 122, storage system 132, I/O device 130 and/or AM printer 106. Bus 128 provides a communication link between each of the components in computer 120, and I/O device 130 can comprise any device that enables a user to interact with computer 120 (e.g., keyboard, pointing device, display, etc.). Computer 120 is only representative of various possible combinations of hardware and software. For example, processor 124 may comprise a single processing unit, or be distributed across one or more processing units in one or more locations, e.g., on a client and server. Similarly, memory 122 and/or storage system 132 may reside at one or more physical locations. Memory 122 and/or storage system 132 can comprise any combination of various types of non-transitory computer readable storage medium including magnetic media, optical media, random access memory (RAM), read only memory (ROM), etc. Computer 120 can comprise any type of computing device such as a network server, a desktop computer, a laptop, a handheld device, a mobile phone, a pager, a personal data assistant, etc.

Additive manufacturing process begins with a non-transitory computer readable storage medium (e.g., memory 122, storage system 132, etc.) storing code 108 representative of object 102. As noted, code 108 includes a set of computer-executable instructions defining object 102 that can be used to physically generate object 102, upon execution of code 108 by system 100. For example, code 108 may include a precisely defined 3D model of object 102 and can be generated from any of a large variety of well-known computer aided design (CAD) software systems such as AutoCAD®, TurboCAD®, DesignCAD 3D Max, etc. In this regard, code 18 can take any now known or later developed file format. For example, code 108 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 108 may be translated between different formats, converted into a set of data signals and transmitted, received as a set of data signals and converted to code, stored, etc., as necessary. Code 108 may be an input to system 100 and may come from a part designer, an intellectual property (IP) provider, a design company, the user or owner of system 100, or from other sources. In any event, AM control system 104 executes code 108, dividing object 102 into a series of thin slices that it assembles using AM printer 106 in successive layers of liquid, powder, sheet or other material. In the DMLM example, each layer is melted to the exact geometry defined by code 108 and fused to the preceding layer. Subsequently, object 102 may be exposed to any variety of finishing processes, e.g., minor machining, sealing, polishing, assembly to another part, etc.

Figure 2:
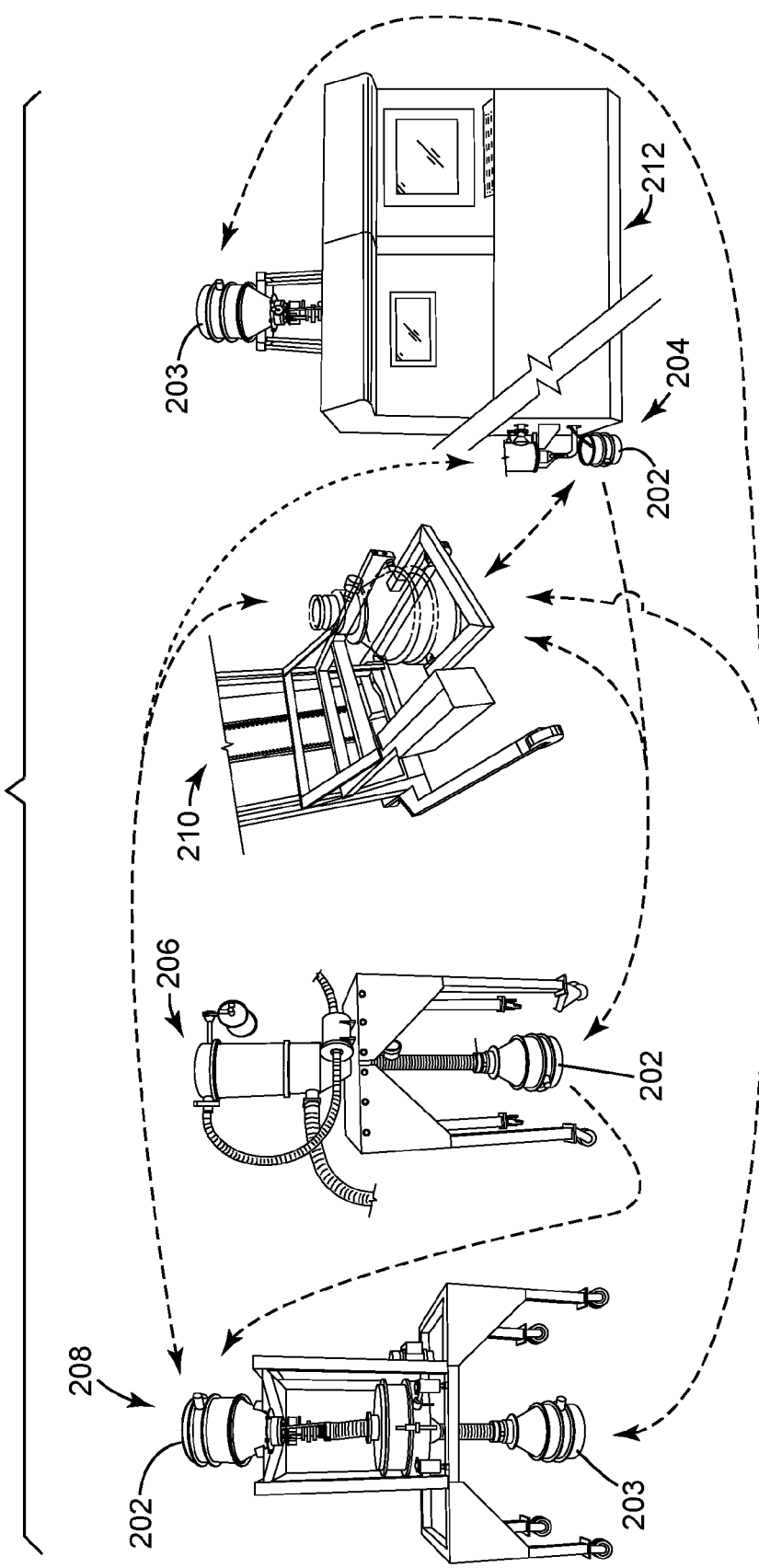
FIG. 2 shows a schematic view of an additive manufacturing powder handling system, including a powder container, an overflow powder collector system, a vacuum system, a sieve system, and a powder container moving apparatus, according to various embodiments.

FIG. 2 shows a schematic view of an additive manufacturing powder handling system 200, including a powder container 202, a duplicate powder container 203 (duplicate of powder container 202), an overflow powder collector system 204, a vacuum system 206, a sieve system 208, and a powder container moving apparatus 210, according to various embodiments. An AM printer 212 is also depicted with additive manufacturing powder handling system 200. AM printer 212 can be any now known or later developed AM printer that uses AM powder. During printing of objects in AM printer 212, excess powder (i.e., overflow powder) fed into AM printer 212, that does not become part of a printed object, can be collected by overflow powder collector system 204 in powder container 202. Powder container 202 can be moved by hand and/or powder container moving apparatus 210 to be coupled with vacuum system 206. Vacuum system 206 can be used to suction overflow AM powder from AM printer 212 into powder container 202. Either overflow powder collector system 204 or vacuum system 206 can be sufficient to collect overflow AM powder, such that embodiments are conceived that include only one of overflow powder collector system 204 or vacuum system 206. Powder container 202 can next be moved by hand and/or powder container moving apparatus 210 to be coupled with sieve system 208. Overflow powder is fed from powder container 202 through sieve system 208, to filter out foreign debris and maintain a proper granule size. Powder exiting sieve system 208 feeds into a duplicate hopper 203, which can be moved by hand and/or powder container moving apparatus 210 to be coupled with AM printer 212, to feed the sieved overflow powder back into AM printer 212. While additive manufacturing powder handling system 200 is illustrated with each of powder container 202, duplicate powder container 203, overflow powder collector system 204, vacuum system 206, sieve system 208, and powder container moving apparatus 210, it is emphasized that embodiments are conceived that do not include any one or more of overflow powder collector system 204, vacuum system 206, sieve system 208, and powder container moving apparatus 210. As discussed above, either overflow powder collector system 204 or vacuum system 206 can be sufficient to collect overflow AM powder. Powder container moving apparatus 210 can be unnecessary if powder container 202 and duplicate powder container 203 are small enough to be handled manually.

Figure 3:
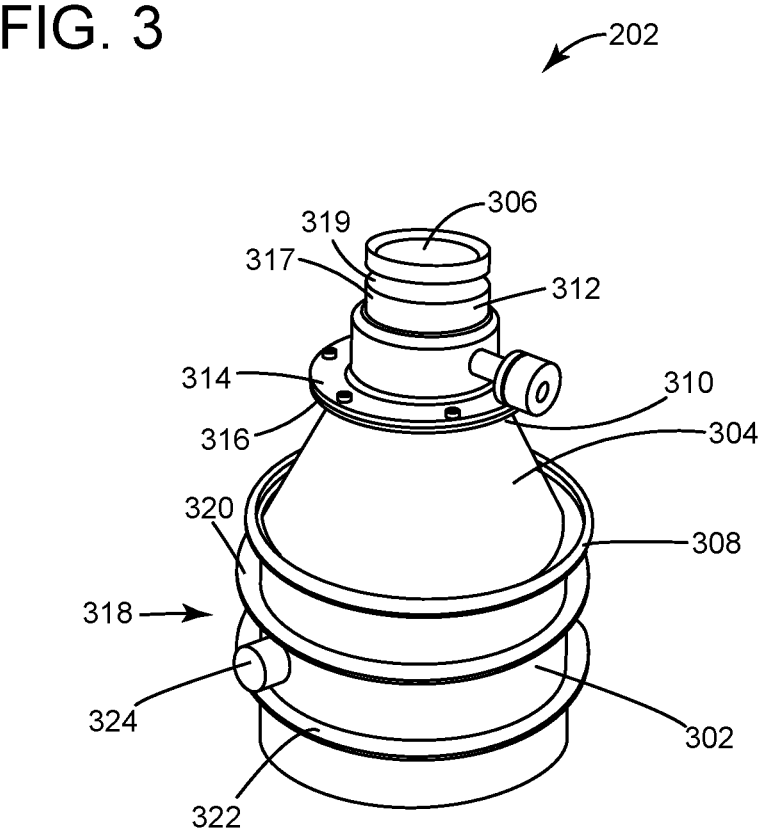
FIG. 3 shows a perspective view of the powder container of FIG. 2, according to various embodiments.

FIG. 3 shows a perspective view of powder container 202, according to various embodiments. Powder container 202 is sized, shaped, and configured to be used in loading an AM printer with AM powder, collecting overflow AM powder that the AM printer removes from the AM printer after printing, collecting vacuumed powder from the AM printer after printing, feeding the collected vacuumed AM powder to a sieve, collecting the sieved AM powder, and reloading the collected sieved AM powder into the AM printer. Multiple powder containers 202 can be used in these operations. While a particular size and configuration of powder container 202 is illustrated and described, it is emphasized that powder container 202 can take a variety of different shapes, sizes, and configurations within the teachings of the disclosure, to achieve the desired function. In any different shape, size, or configuration of powder container 202, all powder containers 202 used with additive manufacturing powder handling system 200 are uniform.

Powder container 202 can be any size of conventional powder containers, or larger. The larger the powder container 202, the less frequently an operator is required to tend to overflow powder. The size of powder containers 202 are limited as a matter of practicality by the size of AM printers, the facilities housing the AM printers, and other associated equipment. Generally, as a matter of practicality, powder containers 202 can be on the scale of the larger sizes of conventional powder containers used for a given AM printer.

Powder container 202 is shown having a body section 302, a funnel section 304, and a powder container outlet 306. Body section 302 is shown being cylindrical, though body section 302 could be any desired shape. Funnel section 304 has a large end 308 that detachably fastens to body section 302. A tapered end 310 of funnel section 304 leads in the tapered direction to powder container outlet 306. In FIG. 3, funnel section 304 is oriented upward relative to body section 302. When funnel section 304 is oriented downward relative to body section 302, however, the funnel shape of funnel section 304 can facilitate directing AM powder to powder container outlet 306. Funnel section 304 can be detached from body section 302 to provide a wider opening to body section 302 for filling or removing AM powder, for example, when powder container 202 is not coupled to another device or system, as described herein below. Funnel section 304 can be fastened to body section 302 for pouring AM powder into or out of powder container 202, and for coupling powder container 202 to overflow powder collector system 204, vacuum system 206, sieve system 208, or AM printer 212 as described herein below.

In order to couple powder container 202 to overflow powder collector system 204, vacuum system 206, sieve system 208, and AM printer 212, powder container 202 includes a powder container coupling 311. Powder container coupling 311 can be integrated as a feature of powder container 202 proximate powder container outlet 306, or a separate entity attachable and detachable from powder container outlet 306. Powder container coupling 311 can be selected from a variety of now-known or future-developed connectors or couplings, within the teachings of the disclosure. For example, a simple straight cylindrical section extending from tapered end 310 of funnel section 304 can provide a structure to which overflow powder collector system 204, vacuum system 206, sieve system 208, and AM printer 212 can connect or couple. In the non-limiting embodiment shown in FIG. 3, powder container coupling 311 includes a connector 312 with a connector flange 314 detachably fastened to a funnel section flange 316 at tapered end 310 of funnel section 304. Connector 312 has a cylindrical section 317, which has a circumferential groove 319. Connector 312 can extend into or receive a mating coupling element or connector of overflow powder collector system 204, vacuum system 206, sieve system 208, and AM printer 212, and the mating coupling or connector can lock and/or seal into circumferential groove 319. A sealed coupling or connection can reduce or prevent stray or spilled AM powder or dust.

Powder containers 202 can be large enough that human operators can have significant difficulty handling powder containers 202. Accordingly, as will be described herein, powder container moving apparatus 210 may be used to assist human operators in lifting, moving, and rotating powder containers 202. To aid powder container moving apparatus 210 in securely and stably holding powder container 202, powder container 202 can be equipped with moving apparatus engagement elements 318, which provide physical structure for powder container moving apparatus 210 to securely engage powder container 202. While a particular configuration of moving apparatus engagement elements 318 is illustrated and described, it is emphasized that moving apparatus engagement elements 318 can have a variety of different shapes and configurations within the teachings of the disclosure. FIG. 3 shows moving apparatus engagement elements 318 including a first ring 320, a second ring 322 parallel to the first ring, and a protruding element 324 between first 320 ring and second ring 322. First ring 320, second ring 322, and protruding element 324 extend radially outward from a radially outward-facing surface 326 of body 302 of powder container 202. Protruding member 324 can include, but not be limited to, a post, a pin, a nub, or a knob. As will be described in greater detail herein, powder container moving apparatus 210 can lock around protruding element 324 and grip between first ring 320 and second ring 322.

Figure 4:
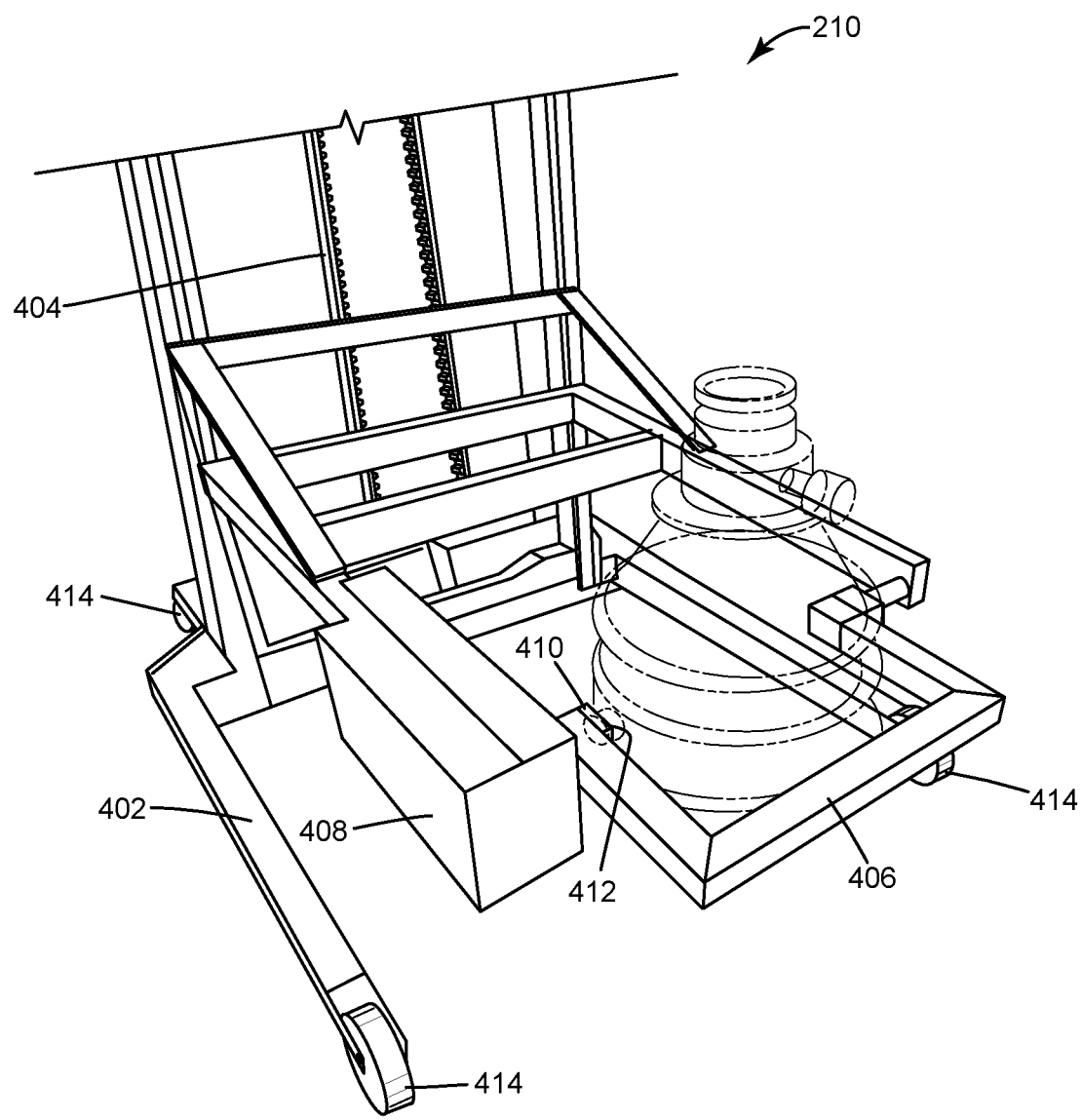
FIG. 4 shows a perspective view of the powder container moving apparatus of FIG. 2, according to various embodiments.

FIG. 4 shows a perspective view of one embodiment of powder container moving apparatus 210, which can be independent and separate from AM printer 212, according to various embodiments. While a particular configuration of powder container moving apparatus 210 is illustrated and described, it is emphasized that powder container moving apparatus 210 can be configured in numerous ways, consistent with the teachings of the disclosure, that achieve the function of securely gripping, lifting, and rotating powder container 202. As illustrated in FIG. 4, powder container moving apparatus 210 includes a rolling base 402, a lifter 404 mounted on rolling base 402, a gripper 406 mounted on lifter 404, and a rotator 408 coupled with gripper 406 to rotate gripper 406. Gripper 406 may include a clamp 410 with a receptacle 412 for accepting insertion of protruding element 324. Clamp fits securely between first and second rings 320, 322. Clamp 408 can fit relatively tightly between first and second rings 320, 322 in order to reduce pivoting of powder container 202 around an axis of protruding element 324. Lifter 404 can move vertically up or down to position powder container appropriately. Rolling base 402 can include a plurality of rollers 414 (e.g., wheels, casters, bearings, etc.) so powder container moving apparatus 210 can be rolled to position powder container 202 appropriately to couple with overflow powder collector system 204, vacuum system 206, sieve system 208, powder container moving apparatus 210, or AM printer 212. Powder container 202 needs to be inverted in some operations, so rotator 408 can rotate gripper 406 and thus container 202 that is held by gripper 106. Lifter 404 and rotator 408 can be conventionally known and can be powered hydraulically, electrically, or by known methods.

Figure 6:
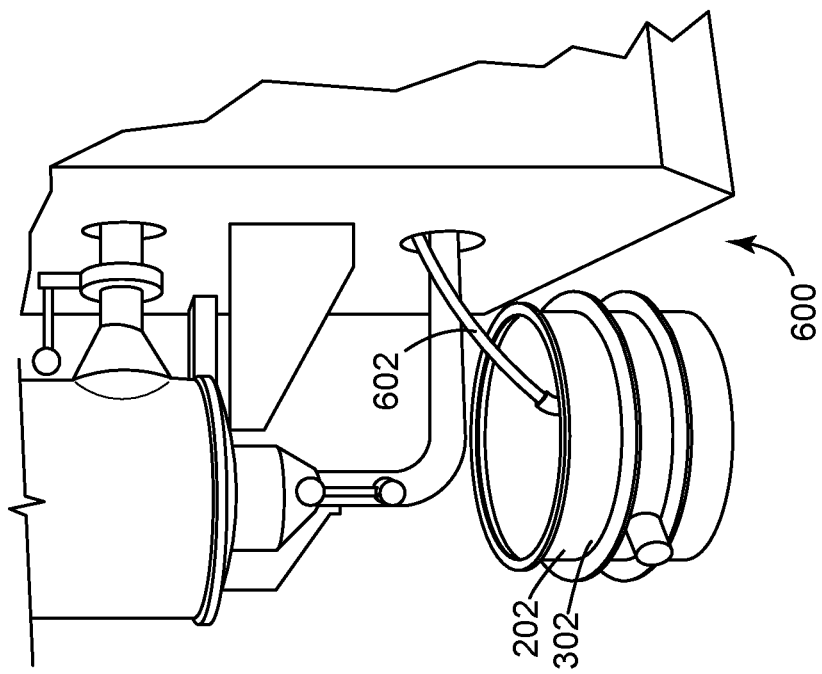
FIG. 6 shows a perspective view of an alternative overflow powder collector system and a body portion of the powder container of FIG. 2, according to various embodiments.
Figure 5:
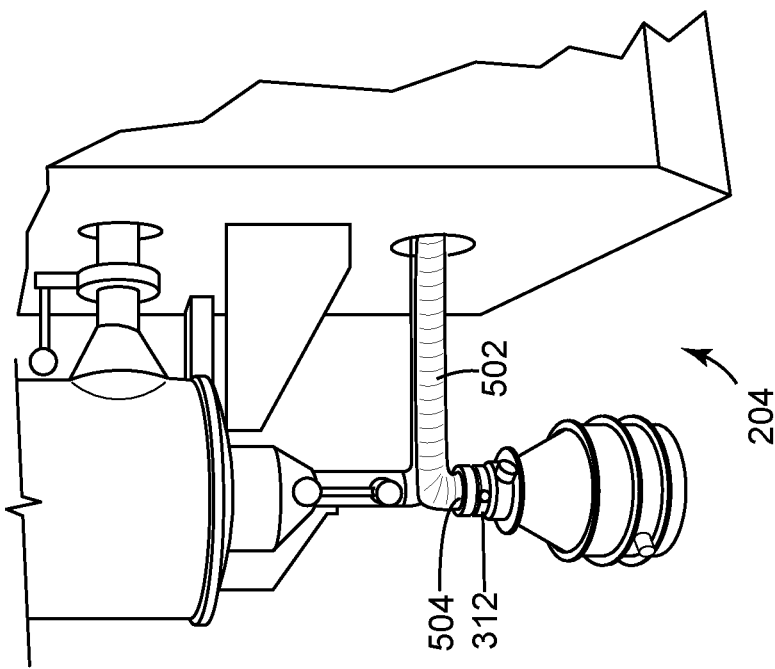
FIG. 5 shows a perspective view of the overflow powder collector system and the powder container of FIG. 2, according to various embodiments.

FIG. 5 shows a perspective view of overflow powder collector system 204 and powder container 202, according to various embodiments. FIG. 6 shows a perspective view of an alternative overflow powder collector system 600 and powder container 202, according to various embodiments. In FIG. 5, the conventional overflow powder collector system of AM printer 212 is modified to replace a relatively small overflow powder collector (not shown) with powder container 202. In some embodiments, an overflow powder outlet conduit 502 can be fitted with an overflow powder outlet connector 504 that is sized and configured to couple with or connect to connector 312 of powder container 202. In other embodiments, as shown in FIG. 6, an overflow powder outlet conduit 602 can pass overflow powder into powder container 202 with no sealed connection between overflow powder outlet conduit 602 and powder container 202. In this case, powder container 202 may have funnel section 304 detached from body section 302, to load powder container 202 with overflow powder, after which funnel section 304 can be reattached to body section 302 before performing a vacuuming operation (discussed herein below) using powder container 202.

Figure 7:
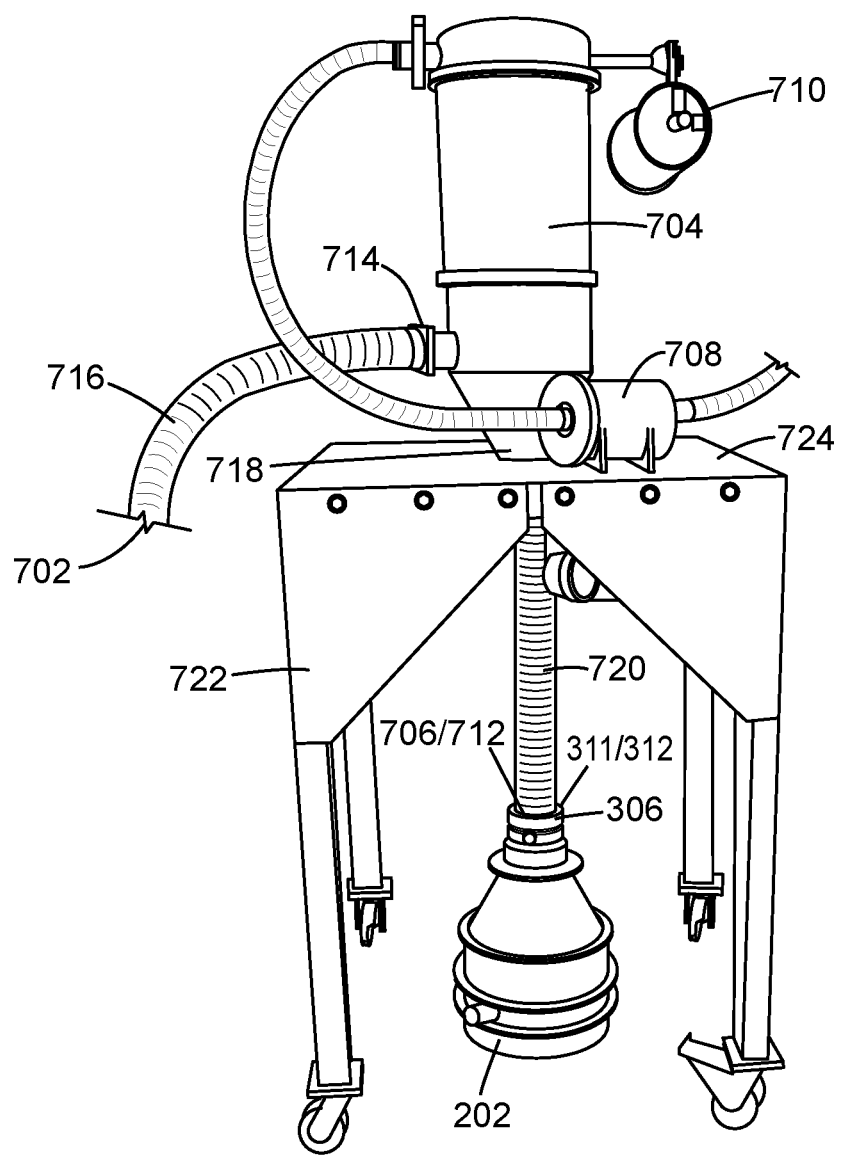
FIG. 7 shows a perspective view of the vacuum system of FIG. 2 coupled with the powder container of FIG. 2 to collect powder vacuumed from an AM printer, according to various embodiments.

Referring to FIG. 2, after collecting overflow powder from a printing process, powder container 202 can be coupled with vacuum system 206 to perform a vacuuming operation to collect further overflow powder and any other powder from AM printer 212. Powder container moving apparatus 210 can be utilized to grip, lift, move, and position powder container 202 to receive powder from vacuum system 206. FIG. 7 shows a perspective view of vacuum system 206 coupled with powder container 202 to collect powder vacuumed from AM printer 212, according to various embodiments. Referring to FIG. 7, vacuum system 206 can be independent and separate from AM printer 212. Vacuum system 206 includes a vacuum system inlet 702, a vacuum container 704, a vacuum system outlet 706, and a vacuum generator 708. Vacuum container 704 and vacuum generator 708 can be conventional equipment. Vacuum generator 708 is coupled with vacuum container 704 to create a vacuum force from vacuum system inlet 702 to vacuum container 704. An air filter 710 can also be coupled with vacuum container 704 to filter air flowing through vacuum system 700.

Vacuum system inlet 702 is configured to receive by vacuum force AM powder from AM printer 212. To receive AM powder 212, vacuum system inlet 702 has an opening 703 through which fluids and small particles can be drawn. Opening 703 can be sized large enough to allow a desired volume of AM powder to enter vacuum system inlet 702 at a given time, and small enough to achieve a desired vacuum force per unit of area of opening 703 to draw AM powder with desired force through vacuum system inlet 702. Vacuum container 704 is coupled with vacuum system inlet 702 to receive the AM powder from vacuum system inlet 702. AM powder enters vacuum container 704 near the bottom of vacuum container 704, and is pulled by gravity downward to vacuum system outlet 706, which is coupled with vacuum container 704 and is configured to couple with, or be received by, powder container coupling 311 or connector 312 proximate powder container outlet 306. Powder container 202 is inverted such that powder flows into powder container 202 through powder container outlet 306, which acts in this situation as an inlet. To couple vacuum system outlet 706 with powder container outlet 306, a vacuum system outlet coupling element (or connector) 712 can be located proximate vacuum system outlet 706 and can be configured to be received by powder container coupling 311 or connector 312, or to detachably fasten to powder container coupling 311 or connector 312. Vacuum container 704 can be coupled with vacuum system inlet 702 via a vacuum container inlet 714 and a vacuum inlet hose 716, and vacuum container 704 can be coupled with vacuum system outlet 706 via a vacuum container outlet 718 and a vacuum outlet hose 720. Inlet hose 716 provides more range from vacuum container 704 and more freedom to maneuver vacuum system inlet 702 to capture overflow AM powder from AM printer 212 or anywhere else, while outlet hose 720 provides more space and ease connecting powder container 202 with vacuum system 206.

Vacuum system 206 can be mounted on a vacuum system rolling frame 722 so that vacuum system 206 can be rolled between AM printers to perform the vacuuming operation. Vacuum system rolling frame 722 comprises a deck 724 and a plurality of support legs 726. Deck 724 is supported on the plurality of support legs 726, and vacuum container 704 is mounted on deck 724. Powder container 202 can be positioned under deck 724 and vacuum container 704 (in an upright orientation, as shown in FIG. 7)) to facilitate moving AM powder from vacuum container 704 to powder container 202 by gravity.

Figure 8:
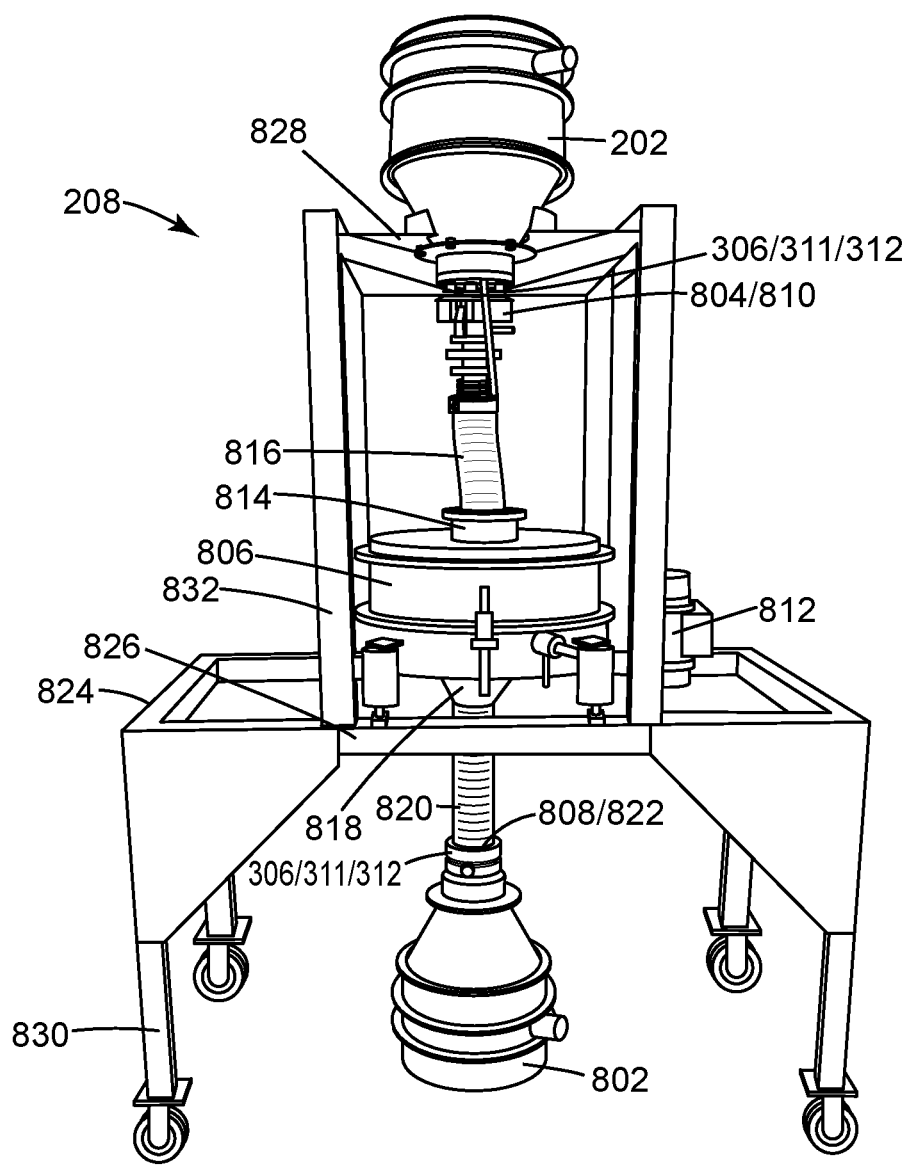
FIG. 8 shows a perspective view of the sieve system of FIG. 2 coupled with the powder container of FIG. 2 and a duplicate powder container, to drain collected overflow powder into the sieve system and to collect sieved powder from the sieve system, according to various embodiments.

After collecting vacuumed powder from a printing process into powder container 202, powder container 202 can be coupled with sieve system 208 to perform a sieving operation (e.g., to filter AM powder) and collect sieved AM powder into a duplicate powder container 802 (see FIG. 8), which is a duplicate of powder container 202 and/or duplicate powder container 203 shown in FIG. 2. Powder container moving apparatus 210 can be utilized to grip, lift, rotate, move, and position powder container 202 to drain powder from powder container 202 into sieve system 208. FIG. 8 shows a perspective view of sieve system 208 coupled with powder container 202 and duplicate powder container 802, to drain collected overflow powder into sieve system 208 and to collect sieved powder from sieve system 208, according to various embodiments. Sieve system 208 can be independent and separate from AM printer 212. Sieve system 208 includes a sieve system inlet 804, a powder sieve 806, and a sieve system outlet 808. Sieve system inlet 804 is configured to couple with powder container outlet 306 to receive AM powder from powder container 202. To couple with powder container outlet 306, a sieve system inlet coupling element 810 can be located proximate sieve system inlet 804 and can be configured to be received by powder container coupling 311 or connector 312, or to detachably fasten to powder container coupling 311 or connector 312.

Powder sieve 806 can be conventionally used equipment, which can use an agitator 812 to shake or vibrate powder through powder sieve 806. Powder sieve 806 is coupled with sieve system inlet 804 and sieve system outlet 808. Powder sieve 806 can be coupled with sieve system inlet 804 via a powder sieve inlet 814 and a sieve intake hose 816. Powder sieve 806 can be coupled with sieve system outlet 808 via a powder sieve outlet 818 and a sieve outlet hose 820. Intake hose 816 provides more space and ease connecting powder container 202 with sieve system 208, while outlet hose 820 provides more space and ease connecting duplicate powder container 802 with sieve system 208. Sieve system outlet 808 is configured to couple with or connect to powder container outlet 306 of powder container 202 and duplicate powder container 802. To couple with powder container outlet 306 of duplicate powder container 802, a sieve system outlet coupling element 822 can be located proximate sieve system outlet 808 and configured to be received by powder container coupling 311 or connector 312, or to detachably fasten to powder container coupling 311 or connector 312.

Sieve system 208 can be mounted on a sieve system frame 824, which can be a rolling frame so sieve system 208 can be rolled to follow vacuum system between AM printers. Frame 824 can also be stationary. Sieve system frame 824 has a lower deck 826, an upper deck 828, a plurality of lower support legs 830, and a plurality of upper support legs 832. Lower deck 826 is supported on the plurality of lower support legs 830. Upper deck 828 is supported on the plurality of upper support legs 832, which are supported on the plurality of lower support legs 830. Powder container 202 can be supported on upper deck 828 to couple with sieve system 808 and use gravity to facilitate draining powder into powder sieve 806. Powder sieve 806 is mounted under upper deck 828 on lower deck 826 (in an upright orientation, as shown in FIG. 8), and duplicate powder container 802 can be coupled to sieve system 208 below lower deck 826 (in an upright orientation, as shown in FIG. 8), to use gravity to facilitate funneling sieved AM powder into duplicate powder container 802.

Figure 9:
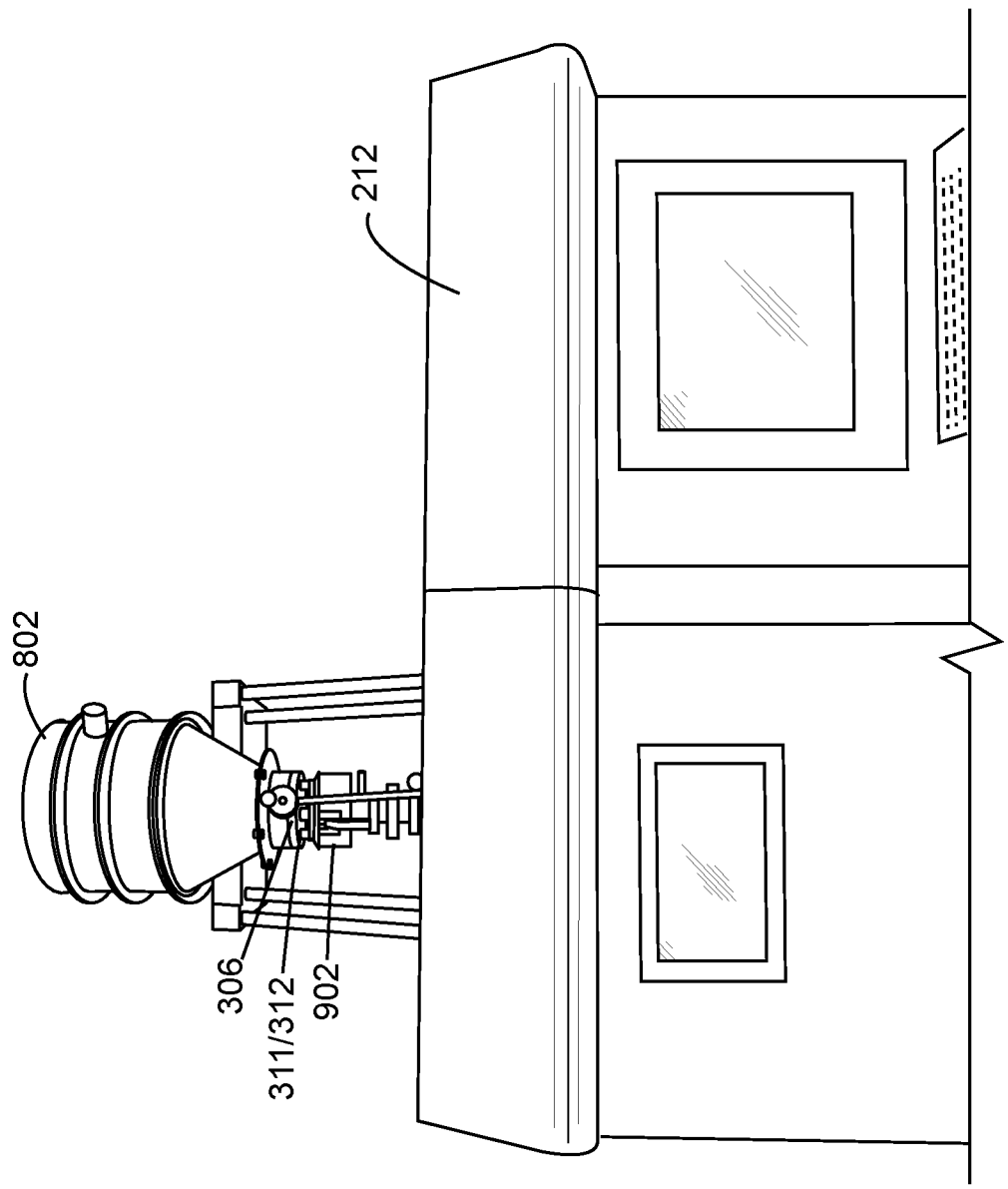
FIG. 9 shows a perspective view of the duplicate powder container of FIG. 2 coupled with the AM printer of FIG. 2, to feed powder into the AM printer, according to various embodiments.

After sieving, sieved overflow powder can be returned to AM printer 212 using powder container moving apparatus 210 to carry large, heavy, duplicate powder container 802, rotate duplicate powder container so powder container outlet 306 faces downward, and position duplicate powder container in place over AM printer to drain the sieved overflow powder back into AM printer 212. FIG. 9 shows a perspective view of duplicate powder container 802 coupled with AM printer 212, to feed powder into AM printer 212, according to various embodiments. AM printer 212 can have a coupling or connector 902 similar or identical to coupling or connector 810, configured to be received by or to couple with powder container coupling 311 or connector 312 of duplicate powder container 802. In this manner using this AM powder handling system 200, overflow powder unused after printing can be handled in bulk quantities, reducing the frequency of handling overflow powder and reducing the number of different containers and connections, saving time and money on equipment and inventory management.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An additive manufacturing powder handling system, comprising:
   a powder container including a powder container outlet and a powder container coupling having a predefined dimension;
   a vacuum system configured to receive by vacuum force additive manufacturing powder from an additive manufacturing printer and pass the additive manufacturing powder into the powder container, wherein the vacuum system is mounted on a rolling frame, wherein the rolling frame comprises a deck and a plurality of support legs, the deck supported on the plurality of support legs, the vacuum container mounted on the deck;
   and
   a powder container moving apparatus configured to move the powder container between the additive manufacturing printer and the vacuum system, the powder container moving apparatus having a lift, a gripper on the lift, and a rotator on the lift, the gripper configured to hold the powder container, the rotator configured to rotate the gripper and any powder container held by the gripper,
   wherein the vacuum system includes at least one coupling element configured to receive the powder container coupling.

2. The additive manufacturing powder handling system of claim 1, wherein the powder container has a cylindrical body section and a conical funnel section, the conical funnel section being configured to detachably fasten to the cylindrical body section, the conical funnel section having a tapered end defining an opening.

3. The additive manufacturing powder handling system of claim 2, wherein the cylindrical body has a radially outward-facing surface, and the powder container comprises a moving apparatus engagement element extending radially outward from the radially outward-facing surface, the moving apparatus engagement element providing a physical structure for the powder container moving apparatus to securely engage the powder container.

4. The additive manufacturing powder handling system of claim 3, wherein the moving apparatus engagement element comprises a first ring, a second ring parallel to the first ring, and a protruding element between the first ring and the second ring.

5. The additive manufacturing powder handling system of claim 1, wherein the vacuum system further comprises a vacuum container, a vacuum system inlet, and a vacuum system outlet, the vacuum container coupled to the vacuum system inlet and the vacuum system outlet, to receive the additive manufacturing powder from the vacuum system inlet and pass the additive manufacturing powder to the vacuum system outlet.

6. The additive manufacturing powder handling system of claim 5, wherein the vacuum system further comprises a vacuum inlet hose and a vacuum outlet hose, the vacuum inlet hose coupled with the vacuum container and the vacuum system inlet, the vacuum outlet hose coupled with the vacuum container and the vacuum system outlet, the coupling element of the vacuum system defining the vacuum system outlet.

7. The additive manufacturing powder handling system of claim 1, further comprising a sieve system configured to filter the additive manufacturing powder, the sieve system having an inlet and an outlet, wherein the powder container moving apparatus is configured to move the powder container between the additive manufacturing printer, the vacuum system, and the sieve system.

8. The additive manufacturing powder handling system of claim 7, wherein the sieve system comprises a frame, the frame having a lower deck, an upper deck, a plurality of lower support legs, and a plurality of upper support legs, the lower deck supported on the plurality of lower support legs, the sieve mounted on the lower deck, the plurality of upper support legs supported on the plurality of lower support legs, the upper deck supported on the plurality of upper support legs.

9. The additive manufacturing powder handling system of claim 7, wherein the vacuum system, the sieve system, and the powder container moving apparatus are each independent and separate from the additive manufacturing printer.

10. An additive manufacturing powder handling system, comprising:
    at least one powder container, the at least one powder container including a powder container outlet;
    at least one powder container connector;
    a vacuum system including a vacuum system inlet, a vacuum system outlet, and a vacuum generator, the vacuum system inlet configured to receive by vacuum force additive manufacturing powder from an additive manufacturing printer, the vacuum system outlet coupled with the vacuum system inlet, the vacuum generator coupled with the vacuum system inlet to create a vacuum force directed into the vacuum system through the vacuum system inlet wherein the vacuum system is mounted on a rolling frame;
    a sieve system including a powder sieve, a sieve system inlet, and a sieve system outlet, the powder sieve to filter the additive manufacturing powder, the sieve system inlet coupled to the powder sieve and configured to receive the additive manufacturing powder from the powder container, the sieve system outlet coupled with the powder sieve;
and
a powder container moving apparatus to move the powder container between the vacuum system, or the sieve system, the powder container moving apparatus having a lift, a powder container gripper on the lift, and a rotator on the lift, the gripper configured to hold the powder container, the rotator configured to rotate the powder container gripper,
the at least one powder container connector configured to detachably connect the at least one powder container with the vacuum system outlet, the sieve system inlet, and the sieve system outlet.

11. The additive manufacturing powder handling system of claim 10, wherein the at least one powder container has a cylindrical body section and a conical funnel section, the conical funnel section being configured to detachably fasten to the cylindrical body section, the conical funnel section having a tapered end defining an opening.

12. The additive manufacturing powder handling system of claim 11, wherein the cylindrical body has a radially outward-facing surface, and the at least one powder container comprises a moving apparatus engagement element extending radially outward from the radially outward-facing surface, the moving apparatus engagement element providing a physical structure for the powder container moving apparatus to securely engage the powder container.

13. The additive manufacturing powder handling system of claim 12, wherein the moving apparatus engagement element comprises a first ring, a second ring parallel to the first ring, and a protruding element between the first ring and the second ring.

14. The additive manufacturing powder handling system of claim 10, wherein the vacuum system further comprises a vacuum container coupled with the vacuum system inlet and the vacuum system outlet, to receive the additive manufacturing powder from the vacuum system inlet and pass the additive manufacturing powder to the vacuum system outlet.

15. The additive manufacturing powder handling system of claim 14, wherein vacuum system further comprises a vacuum inlet hose and a vacuum outlet hose, the vacuum inlet hose coupled with the vacuum container and the vacuum system inlet, the vacuum outlet hose coupled with the vacuum container and the vacuum system outlet.

16. The additive manufacturing powder handling system of claim 10, wherein the sieve system further comprises a sieve intake hose and a sieve outlet hose, the sieve intake hose coupled with the sieve system inlet and the powder sieve, the sieve outlet hose coupled with the powder sieve and the sieve system outlet.

17. The additive manufacturing powder handling system of claim 10, wherein the vacuum system and the sieve system are independent and separate from the additive manufacturing printer.

18. The additive manufacturing powder handling system of claim 1, further comprising an overflow powder collector system configured to collect overflow additive manufacturing powder from the additive manufacturing printer and pass the overflow additive manufacturing powder into the powder container, wherein the powder container moving apparatus is configured to move the powder container between the additive manufacturing printer, the vacuum system, and the overflow powder collector system.

19. The additive manufacturing powder handling system of claim 10, further comprising an overflow powder collector system configured to collect overflow additive manufacturing powder from the additive manufacturing printer and pass the overflow additive manufacturing powder into the at least one powder container, wherein the powder container moving apparatus is configured to move the at least one powder container between the additive manufacturing printer, the vacuum system, and the overflow powder collector system.

* * * * *